(12) United States Patent
Inman et al.

(10) Patent No.: US 10,161,772 B1
(45) Date of Patent: Dec. 25, 2018

(54) VARIABLE ORIFICE FLOW SENSOR

(71) Applicant: General Electric Company, Schenectady, NY (US)

(72) Inventors: Scott Andrew Inman, Madison, WI (US); Christopher Scott Goplen, Madison, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/728,001

(22) Filed: Oct. 9, 2017

(51) Int. Cl.
*G01F 1/42* (2006.01)
*G01F 15/14* (2006.01)

(52) U.S. Cl.
CPC .............. *G01F 1/42* (2013.01); *G01F 15/14* (2013.01)

(58) Field of Classification Search
CPC .................................... G01F 1/42; G01F 1/58
See application file for complete search history.

(56) References Cited

U.S. PATENT DOCUMENTS

| | | | |
|---|---|---|---|
| 7,798,016 B2 * | 9/2010 | Bonassa ................... | G01F 1/42 73/861.61 |
| 9,329,065 B2 * | 5/2016 | Mashak ................... | G01F 1/40 |
| D772,743 S | 11/2016 | Mashak | |
| 9,983,033 B2 * | 5/2018 | Adler ........................ | G01F 1/00 |
| 2016/0025534 A1 | 1/2016 | Mashak et al. | |

* cited by examiner

*Primary Examiner* — Jewel V Dowtin
(74) *Attorney, Agent, or Firm* — Boyle Fredrickson, S.C.

(57) ABSTRACT

A fluid flow sensor is provided that includes a flow sensor cartridge that is insertable within the fluid flow sensor and that provides greatly enhanced repeatability for the movement of the flow element without undesired engagement of the flow element with the flow body. The cartridge includes a saddle carrier and frame structure that forms a housing for the flow element to enable the flow element to be consistently positioned within the cartridge during manufacture. The flow element cartridge also includes non-uniform fulcrums to enable different but repeatable flexing properties for the flow element within the flow body and non-vertical hinge geometries that reduce stress on the flow element when bending, thereby increasing the useful life of the flow element and fluid flow sensor. The cartridge can also include an over-molded connection between the cartridge and the pressure measurement tubes to provide elastic strain relief on the tubes connected to the cartridge.

20 Claims, 4 Drawing Sheets

VARIABLE ORIFICE FLOW SENSOR

BACKGROUND

The disclosure relates generally to flow sensors, and more particularly, to variable orifice fluid flow sensors.

Orifice flow sensors are used to measure the flow rates of fluids, which include liquids and gases. A typical orifice flow sensor comprises a fixed orifice through which a fluid is made to flow. A pressure difference is established between the fluid that is present upstream from the orifice and the fluid that is flowing through the orifice. This pressure difference can be used to measure the flow rate of the fluid. For this purpose, a pressure transducer measures the pressure difference that is established across the orifice, and is calibrated such that the flow rate of the fluid is calculated from this pressure difference.

Variable orifice flow sensors provide sufficient pressure difference for measurement purposes across a broad range of flow rates. This is achieved by introducing a bending member into the fluid flow passage. The bending member is mounted to the housing for the fluid flow passage and includes a flapper or flow element that is positioned across the fluid flow passage and bends or flexes in the direction of the fluid flow as a result of contact with the fluid flow, and hence creates a variable orifice within the fluid flow passage. The measurement of flow rates in a variable orifice flow sensor is similar to the measurement of flow rates in fixed orifice flow sensors. That is, a pressure transducer measures the pressure difference across the variable orifice and calculates the flow rate of the fluid from the pressure difference.

Orifice gas flow sensors are commonly used for measuring flow rates in medical applications, such as breathing apparatuses that deliver desired quantities of breathing gases to a patient. When used to measure breathing gases or recirculating breathing gases, the gases flowing through the sensor may contain moisture.

In the case where a gas flowing through a variable orifice flow sensor includes moisture, the moisture may condense and form liquid droplets that may accumulate in the sensor, which can produce problems with consistent and repeatable operation of the sensor, such as by interfering with the flexing of the flow element or the tubes utilized to sense the differential across the sensor, thereby impacting the accuracy of the results obtained by the sensor.

Current fluid flow sensors have additional limitations regarding the flow element including issues with the flow element "sticking" in an open position thereby causing failure of the sensor, issues with repeatability of measurements taken using the sensor due to issues with repeatability manufacture of the sensor and of the bending of the flow element, as well as kinking of the tube connected to the sensor, among others.

As a result, it is desirable to develop a flow sensor that addresses each of these shortcomings of prior art fluid flow sensors.

SUMMARY

To address the issues present in prior art fluid flow sensors, a fluid flow sensor formed according to one aspect of the invention includes a flow sensor cartridge that is insertable within the fluid flow sensor and that provides greatly enhanced repeatability for the movement of the flow element without undesired engagement of the flow element with the flow body. The cartridge includes a saddle carrier and frame structure that forms a housing for the flow element to enable the flow element to be protected and consistently positioned within the flow body during manufacture. The flow element cartridge also includes non-uniform fulcrums to enable different but repeatable flexing properties for the flow element in both flow directions and non-vertical hinge geometries that reduce stress on the flow element when bending, thereby increasing the useful life of the flow element and fluid flow sensor.

According to another aspect of the invention, the cartridge for the flow sensor has an over-molded connection between the saddle carrier and the pressure measurement tubes connected to the saddle carrier. The over-molded connection provides elastic strain relief on the tubes connected to the saddle.

According to still another aspect of the invention, the fluid flow sensor includes condensation management elements disposed on the flow body for the fluid flow sensor. The condensation management elements enable the flow body to direct droplets of condensation away from the tube ports to prevent the droplets from occluding the pressure sensing ports for the tubes.

In one exemplary embodiment, a flow sensor includes a flow body that defines a fluid flow passage therethrough, the flow body having a first end and a second end and a flow element assembly including a variable orifice flow sensor element adapted to deflect or bend to create a differential pressure between the first end and the second end and a pair of frames fixed to one another around the variable orifice flow sensor element.

In another exemplary embodiment, a flow element assembly for a flow sensor includes a variable orifice flow sensor element adapted to deflect or bend to create a differential pressure for measurement of flow rate and a pair of frames fixed to one another around the variable orifice flow sensor element.

According to another exemplary embodiment, a fluid flow sensor includes a flow body that defines a fluid flow passage therethrough, the flow body comprising a first end and a second end and a variable orifice flow sensor element disposed within the fluid flow passage which deflects or bends to create a differential pressure between the first end and the second end, wherein the flow body includes at least one overflow damage prevention surface adjacent the flow sensor element, the at least one overflow damage prevention includes a flat non-cylindrical surface.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
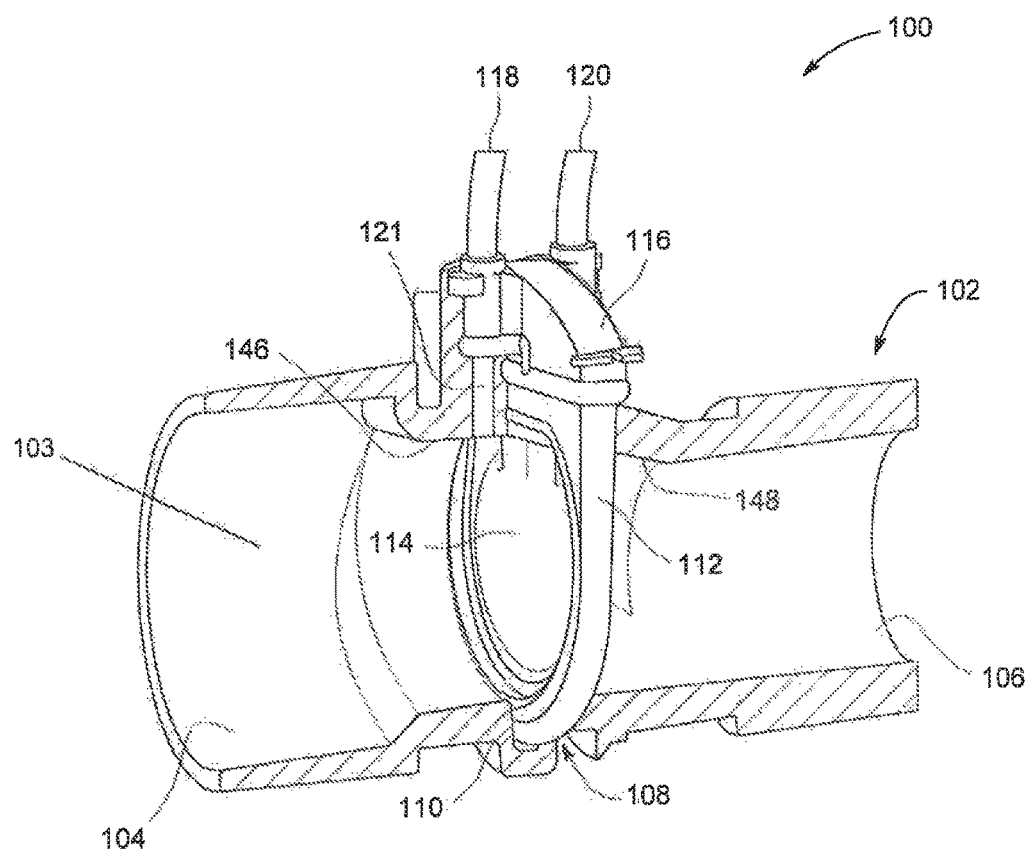
FIG. 1 is an isometric view of a fluid flow sensor and cartridge structure in accordance with an exemplary embodiment.

FIG. 1 illustrates an isometric view of a fluid flow sensor 100 in accordance with one embodiment, Fluid flow sensor 100 is used to measure flow rates of fluids, such as moist gases, flowing through the fluid flow sensor 100, for example, by developing pressure differences within the fluid flow sensor 100 that are used to measure flow rates of the fluids. Fluid flow sensor 100 has a generally cylindrical configuration. However, fluid flow sensor 100 may be formed in a variety of shapes and sizes and still lie within the scope of this invention.

Figure 2:
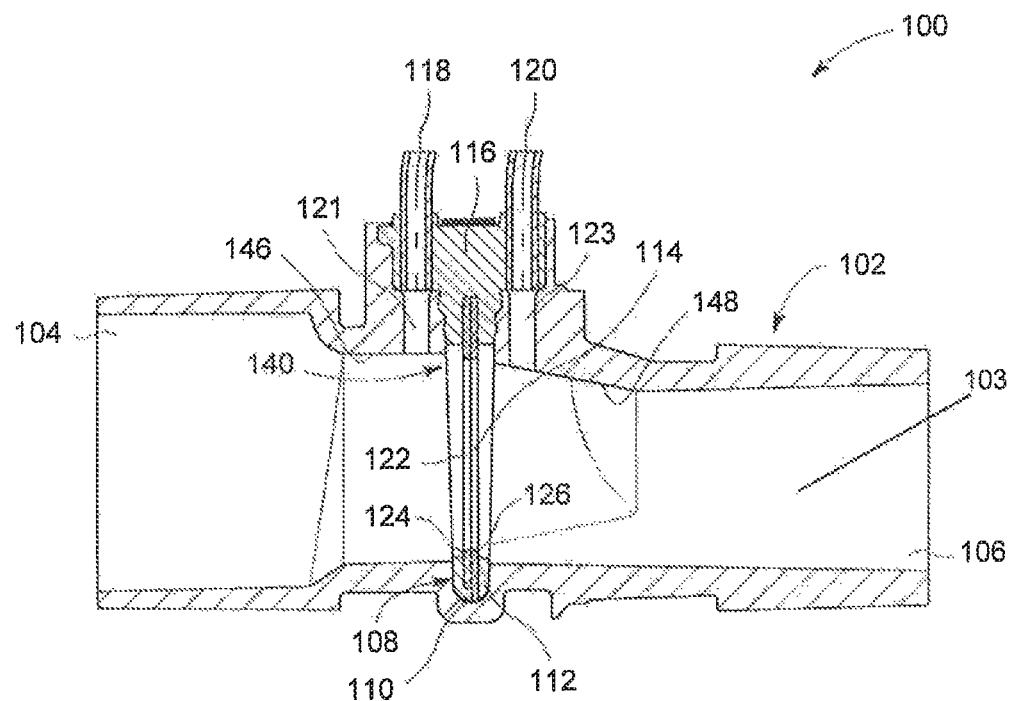
FIG. 2 is a cross-sectional view of the fluid flow sensor of FIG. 1 in accordance with an exemplary embodiment.
Figure 3:
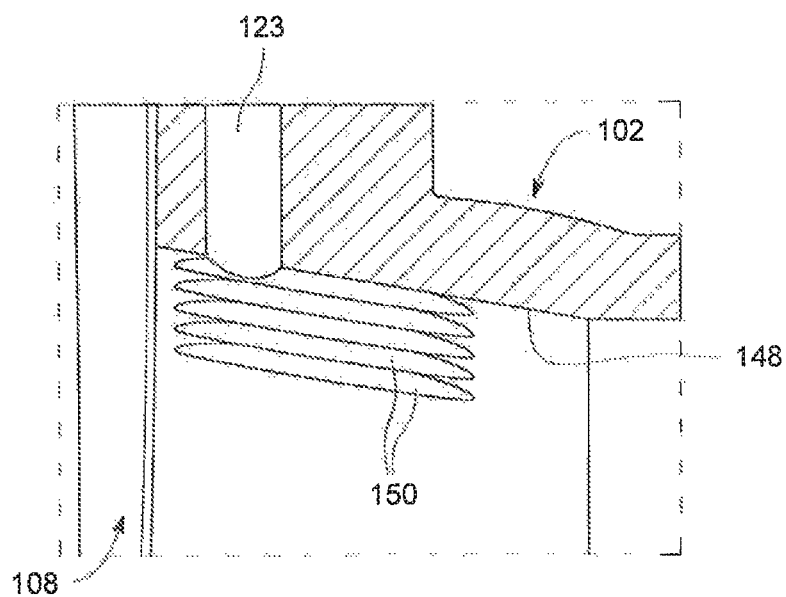
FIG. 3 is a partially broken away, cross-sectional view of a condensation management features in the fluid flow sensor of FIG. 1 in accordance with an exemplary embodiment.
Figure 4:
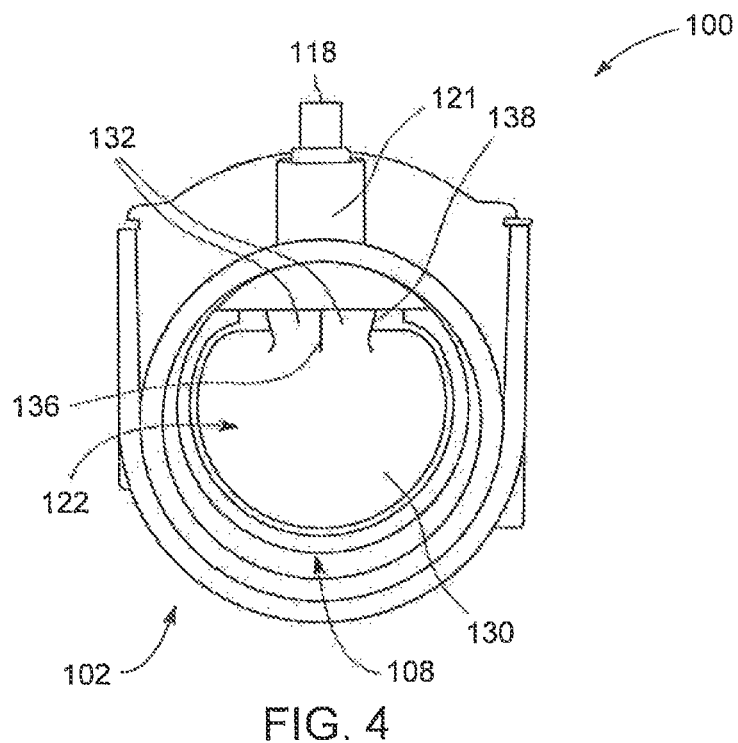
FIG. 4 is a side plan view of the fluid flow sensor structure in accordance with another exemplary embodiment.

FIGS. 1-3 illustrate an exemplary embodiment of the fluid flow sensor 100 comprising a housing or flow body 102 that defines a fluid flow passage 103 therethrough having an first end 104 and an second end 106. When fluid flow sensor 100 is used for measuring gas flow rates in a breathing apparatus, the fluid flow sensor 100 is inserted at one or more desired locations in a breathing circuit where the breathing gas is introduced into the flow body 102 of the fluid flow sensor 100 through the first end 104 to pass through the fluid flow passage 103 and exit though the second end 106 to continue through the breathing circuit. The measurements made to determine the flow rate of the gas passing through the fluid flow sensor 100 are made as the gas passes through fluid flow passage 103 in the flow body 102 from the first end 104 to the second end 106. The flow sensor 100 can also measure the flow rate of the fluid passing from the second end 106 to the first end 104.

Between the first end 104 and the second end 106 of the flow body 102 is disposed a flow sensor cartridge 108. The cartridge 108 has a cross-sectional shape corresponding to the shape(s) of fluid flow passage 103 and is slidably inserted and positioned within a complementary recess 110 formed in the perimeter of the flow body 102.

Referring now to the exemplary embodiment illustrated in FIGS. 1, 2, 4 and 5, the flow sensor cartridge 108 is formed with a carrier 112 that conforms to the shape of the recess 110 in order to form non-adhesive internal/external sealing between the flow body 102 and carrier 112, thereby eliminating the adhesive and/or expensive threaded two-part flow bodies in prior art flow sensors. The carrier 112 is formed of a suitable resilient material, such as a rubber, e.g., a silicone rubber, and surrounds a flow element assembly 114 positioned within the carrier 112, such that the carrier 112 provides shock resistance to the flow element assembly 114 disposed within the carrier 112.

In addition, the carrier 112 is also formed with a head section 116 disposed adjacent the flow element assembly 114. The head section 116 is positioned at least partially on the exterior of the flow body 102 such that the pressure sensing tubes 118,120 utilized to determine the pressure drop within the flow body 102 can be connected to the head section 116 in alignment with ports 121,123 in fluid communication with the flow passage 103 through the flow body 102. Prior art flow sensors have significant issues with tube kinking at the connection point to the flow sensor, which causes the occlusion of the tube(s) and consequent sensor errors. To address this issue, when formed on an existing carrier 112 or integrally with the carrier 112, the head section 116 is over-molded to the tube(s) 118,120 to secure the tube(s) 118,120 within the head section 116 thus providing elastic strain relief at the point of connection between the tube(s) 118,120 and the head section 116 and reducing kinking of the tube(s) 118,120.

Referring now to the exemplary embodiment illustrated in FIGS. 4-7, the flow element assembly 114 disposed within the carrier 112. The assembly 114 is formed of a flow element 122 that functions by deflecting or bending to create a differential pressure that adjusts with changing flow rate through the flow body 102. The ability of the flow element 122 to bend consistently and maintain its position within the flow body 102 produces a repeatable and accurate flow sensor 100. In the assembly 114, the flow element 122 is formed of a thin sheet of a suitable material that is located between a pair of rigid frames 124,126. The two frames 124,126 are formed of suitable materials, such as a metal or plastic, that can be welded, mechanically fastened, press fit, adhered or otherwise connected together in a suitable manner to retain the thin flow element 122 in between the frames 124,126 by fixing the frames 124,126 to one another. The frames 124,126 forming the exterior of the assembly 114 provide rigid, non-adhesive, and easily-handled assembly for the assembly 114 that not only protects the thin flow element 122 during manufacturing of the cartridge 108, but ensures the flow element 122 does not move relative to the frames 124,126 in order to create a repeatable and durable flow sensor cartridge 108. Further, the frames 124,126 can be formed to include locating features 127 thereon to assist in the proper placement and/or engagement of the assembly 114 within the carrier 112 and/or recess 110 of the flow body 102, such as a tab 129 extending outwardly from one or both of the frames 124,126 to be inserted within a locating slot (not shown) in the carrier 112 and/or the recess 110 for properly aligning the assembly 114 within the carrier 112 and/or the carrier 112 within the recess 110. In alternative embodiments, the flow element assembly 114 can be utilized without the carrier 112, such that the assembly 114 is positioned between suitable sealing elements (not shown), such as O-ring seals, to restrict fluid flow along the fluid passage 103 of the sensor body 102 through the assembly 114.

The variable orifice flow sensor element 122 itself is formed with a perimeter 128 secured between the frames 124,126 and a movable flow diaphragm/member 130 formed integrally with the perimeter 128 and fixed thereto by a hinge(s) 132 formed between the perimeter 128 and the flow member 130. The flow member 130 is separated from the perimeter 128 but a number of cuts 134 that enable the flow member 130 to bend or deflect with regard to the perimeter 128 via the hinge(s) 132. The cuts 134 define the hinge(s) 132, and are formed to provide the desired amount of deflection for the flow member 130 relative to the perimeter 128. In the illustrated exemplary embodiment of FIGS. 6 and 7, the cuts 134 forming the hinge(s) 132 includes a vertical cut 136 disposed at the center of the hinge(s) 132 forming a vertical surface on the hinge(s) 132, and a pair of angled cuts 138 spaced to either side of the center cut 136, forming angled surfaces on/V-shapes for the hinge(s) 132. The angled cuts 138 form angled/V-shaped hinge(s) 132 with repeatable bending characteristics, and function to reduce overflow/over-bending damage done to the hinge(s) 132. Further, the angled orientation of the cuts 138 operates to extend the operational lifetime of the flow member 130.

As the material stresses at the hinge(s) 132 must remain below the yield stress of the material forming the flow element 122, the angled cuts 138 forming the hinge(s) 132 allows bending stresses along the hinge(s) 132 to be distributed more evenly along the length of the hinge(s) 132 between the termination points of the cuts 136,138, thereby, reducing and/or eliminating high stress points along the hinge(s) 132.

As a result of the increased distribution of the bending stresses along the hinge(s) 132, materials with a lower yield strength can be employed to form the flow member 130. In one exemplary embodiment, a flow element 122 including the flow member 130 connected to the perimeter 128 by one or more hinge(s) 132 including one or more angled cuts 138 to form the hinge(s) 132 can be used separately from the assembly 114 and from the cartridge 108 within a separate mounting structure (not shown) within a flow body 102. Further, according to another exemplary embodiment a flow member 130 for use in Magnetic Resonance Imaging (MRI) system environment should be formed from a non-magnetic material, as magnetic flow elements are inaccurate and unusable in this environment due to the interaction of the magnetic field in the MRI on the flow member 130. With its low yield strength and a result of the reduced stress in the hinge(s) 132 due to the angled cuts 138, titanium, a titanium alloy or other suitable materials, such as plastic of other non-magnetic materials and/or metals can be used to form the flow member 130, as these materials are nor'-magnetic and retain the other material qualities that are important to flow member 130 function, such as yield stress, flatness, ability to be rolled into a thin sheet, corrosion resistance, elastic modulus, and chemical compatibility among others.

Figure 5:
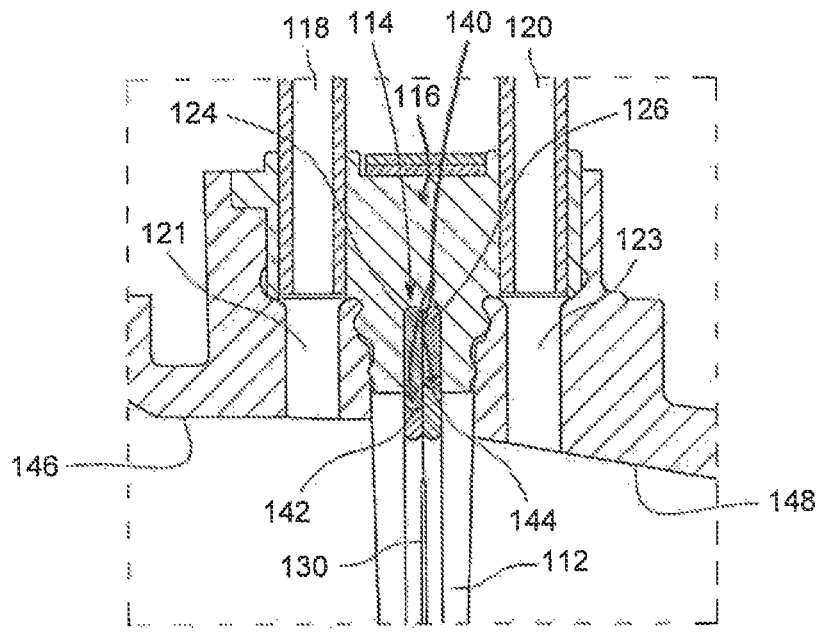
FIG. 5 is a partially broken away, cross-sectional view of the cartridge sensor structure in accordance with another exemplary embodiment.
Figure 6:
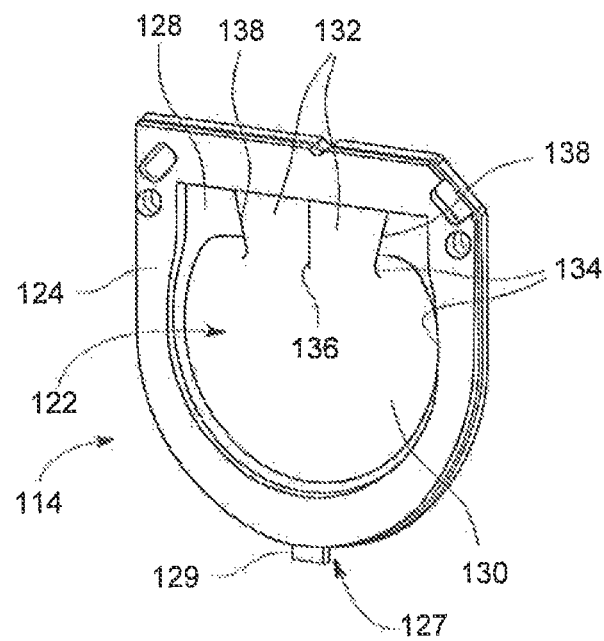
FIG. 6 is an isometric view of a flow element assembly of the cartridge sensor structure in accordance with another exemplary embodiment.
Figure 7:
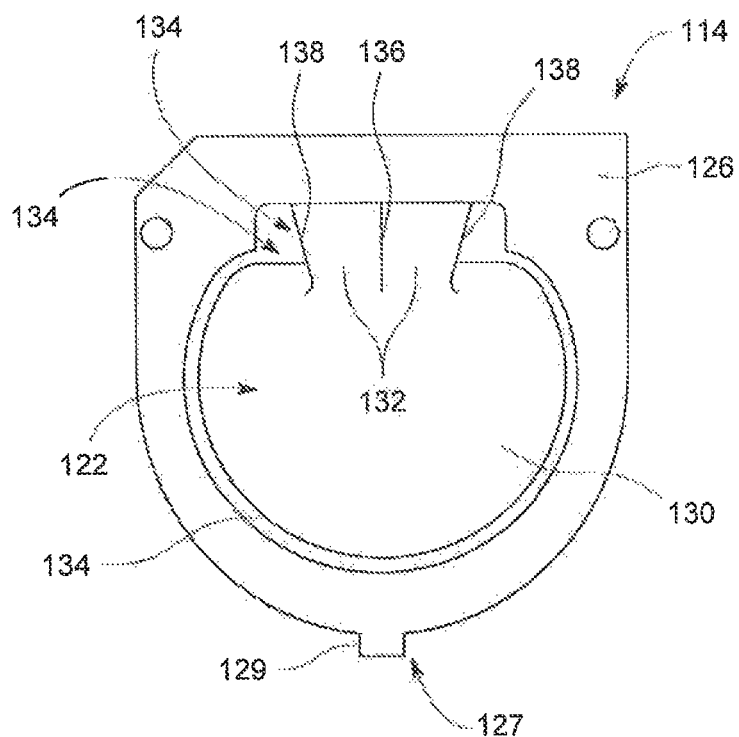
FIG. 7 is a front plan view of the flow element assembly of FIG. 6 in accordance with another exemplary embodiment.

Looking now at the exemplary embodiments illustrated in FIGS. 2 and 5, in conjunction with the profile, thickness, and internal flow geometry of the flow member 130, the bending fulcrum 140 of the flow member 130 of the variable orifice flow sensor element 122 balances adequate sensor gain and too much flow restriction within the flow body 102. The sensor element 122/flow member 130 function in both flow directions within the flow body 102, meaning that the flow member 130 must bend and be accurate with respect to fluid flow in both directions through the flow body 102. However, as a result of the non-uniform diameters of the flow body 102 on each side of the flow element 122, a single bending fulcrum 140 cannot adequately optimize the operation of the flow element 122 for fluid flow in both directions. Thus, as shown in FIGS. 2 and 5, the bending fulcrum 140 is formed with an long fulcrum 142 and a short fulcrum 144. The long fulcrum 142 and short fulcrum 144 are formed as portions of the frames 124,126 that cover more or less of the hinge(s) 132 connecting the flow member 130 to the perimeter 128. In the illustrated exemplary embodiment, the long fulcrum 142 is longer and covers more of the hinge(s) 132 than the adjacent short fulcrum 144, such that the bending of the hinge(s) 132 is more restricted by the long fulcrum 142 in the direction of the first end 104 than when the hinge(s) 132 bends with respect to the short fulcrum 144 in the direction of the second end 106. The non-uniform flow element fulcrums 142,144 allow the bending/operation of the variable orifice flow sensor element 122 to be optimized in both flow directions independently for gain and low flow accuracy, while maintaining a low flow restriction and back pressure across the flow element 122. Further, the use of the frames 124,126 about the flow element 122 prevent the movement of the flow element 122/flow member 130 relative to the frames 124,126 and the fulcrums 142, 144, thereby enhancing the repeatability of the operation of the flow sensor cartridge 108.

In conjunction with the fulcrums 142,144, the bending of the flow member 130 within the flow body 102 is also constrained by the flow body 102 itself. Under high constant or pulsed fluid flow rates in either direction along the flow passage 103 or when the flow diaphragm/member 130 is bent during misuse, the flow member 130 can deflect or bend sufficiently relative to the saddle cartridge 108 to a point where the flow member 130 contacts the interior surface of the flow body 102. In that position, the flow member 130 can get pushed upward into the top cylindrical surface of the flow body 102, causing the flow diaphragm/member 130 to deform/conform and stick into the curved geometry of the flow passage 103 within the flow body 102. In the illustrated exemplary embodiment of FIGS. 1-5, the flow body 102 is formed with one or more overflow damage prevention surfaces 146,148 on one or both sides of the saddle cartridge 108. The surfaces 146,148 are formed on the top of each adjacent section of the flow body 102 and in the illustrated exemplary embodiment are surfaces 146,148 that extend in a flat configuration across the width of the flow body 102 adjacent the cartridge 108. In this configuration, the surfaces 146,148 operate by preventing the distortion or flexing of the flat flow member 130 into the flow body 102 geometry and thus not allowing the flow member 130 to bend in such manner as to lock the flow member 130 into the internal geometry of the flow body 102. Further, as shown in the illustrated exemplary embodiment of FIG. 2, the flat surfaces 146,148 can be formed on horizontal internal surfaces of the flow body 102, as present between the saddle cartridge 108 and the first end 104 of the flow body 102, or on an angled internal surface of the flow body 102, as present between the second end 106 of the flow body 102 and the saddle cartridge 108. In another exemplary embodiment, the flow body 102 including one or more of the overflow damage prevention surfaces 146,148 can be utilized with a flexible flow member other than the cartridge 108 and/or component parts thereof.

Looking now at the exemplary illustrated embodiment of FIG. 3, when the flow sensor 100 is utilized in high humidity cases, water droplet(s) (not shown) often form inside the flow sensor 100. These droplets can wick into and occlude the pressure sensing ports 121,123 and associated tubes 118,120 on either side of the cartridge 108. To prevent or mitigate the occlusion presented by the droplets, the sensor body 102 can be formed with droplet management inverted ribs/recessed channels 150 disposed on either side of the saddle cartridge 108 adjacent the pressure sensing ports 121,123. The recessed channels 150, as opposed to prior art ribs that extend into the flow passage 103 from the interior surface of the flow body 102, are cut into the interior surface of the flow body 102, such that they do not protrude outwardly into the flow passage 103. The channels 150 have an increasing depth as they extend away from the pressure sensing port 122,123 or saddle cartridge 108, enabling the channels 150 to draw the droplets into the channels 150, optionally in conjunction with the hydrophilic nature of the material or coating (not shown) applied to the material in which the channels 150 are formed. With this construction, the channels 150 prevent water droplets from increasing in size and blocking flow within the passage 103 and/or occluding pressure sensing ports 121,123. In another exemplary embodiment, the flow body 102 including the recessed channels 150 can be utilized with a flexible flow member other than the cartridge 108 and/or component parts thereof.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flow sensor comprising:
   a flow body that defines a fluid flow passage therethrough, the flow body having a first end and a second end; and
   a flow element assembly comprising:
      a variable orifice flow sensor element adapted to deflect or bend to create a differential pressure between the first end and the second end; and
      a pair of frames fixed to one another around the variable orifice flow sensor element.

2. The flow sensor of claim 1, further comprising a cartridge, the cartridge comprising:
   a carrier adapted extending across the flow body and sealingly engaging an internal perimeter of the fluid flow sensor; and
   the flow element assembly including a variable orifice flow sensor element, the flow element assembly disposed within the carrier.

3. The flow sensor of claim 2, with the carrier comprising:
   a head section connected to the carrier; and
   a number of tubes connected to the head section by over-molded portions of the head section.

4. The flow sensor of claim 2, wherein the carrier is formed of a shock-absorbing material.

5. The flow sensor of claim 1, wherein each of the pair of frames is formed with a bending fulcrum engageable with the flow sensor element, the size of the bending fulcrums on each of the pair of frames being different from one another.

6. The flow sensor of claim 1, wherein the variable orifice flow sensor element comprises:
   a perimeter positioned between the pair of frames; and
   a flow member connected to the perimeter by a hinge, wherein the hinge is formed by at least one angled cut between the perimeter and the flow member.

7. The flow sensor of claim 6, wherein the hinge is of V-shape.

8. The flow sensor of claim 1, wherein the flow sensor element is formed of a non-magnetic material.

9. The flow sensor of claim 1, wherein the flow element is formed of titanium or a titanium alloy.

10. The fluid flow sensor of claim 1, wherein the flow body includes at least one overflow damage prevention surface adjacent the flow element assembly, the at least one overflow damage prevention includes a flat non-cylindrical surface.

11. The flow sensor of claim 1, wherein the flow body further comprises:
    a number of pressure sensing ports disposed adjacent the flow element assembly; and
    a number of droplet management recessed channels disposed adjacent at least one of the pressure sensing ports.

12. The flow sensor of claim 11, wherein the number of droplet management channels are formed with a depth that increases as the channels extend away from the pressure sensing port.

13. A flow element assembly for a flow sensor, the flow element assembly comprising:
    a variable orifice flow sensor element adapted to deflect or bend to create a differential pressure for measurement of flow rate; and
    a pair of frames fixed to one another around the variable orifice flow sensor element.

14. The flow element assembly of claim 13, wherein each of the pair of frames is formed with a bending fulcrum engageable with the flow sensor element, the size of the bending fulcrums on each of the pair of frames being different from one another.

15. The flow element assembly of claim 13, wherein the variable orifice flow sensor element comprises:
    a perimeter positioned between the pair of frames; and
    a flow member connected to the perimeter by a hinge, wherein the hinge is formed by at least one angled cut between the perimeter and the flow member.

16. The flow element assembly of claim 15, wherein the hinge is of V-shape.

17. The flow element assembly of claim 13, wherein the flow sensor element is formed of a non-magnetic material.

18. The flow element assembly of claim 13, wherein the flow element is formed of titanium or a titanium alloy.

19. A fluid flow sensor comprising:
    a flow body that defines a fluid flow passage therethrough, the flow body comprising a first end and a second end; and
    a variable orifice flow sensor element disposed within the fluid flow passage which deflects or bends to create a differential pressure between the first end and the second end,
    wherein the flow body includes at least one overflow damage prevention surface adjacent the flow sensor element, the at least one overflow damage prevention includes a flat non-cylindrical surface.

20. The fluid flow sensor of claim 19, wherein the flow body further comprises:
    a number of pressure sensing ports disposed adjacent the cartridge; and
    a number of droplet management recessed channels disposed adjacent at least one of the pressure sensing ports.

* * * * *